United States Patent
Hada et al.

(10) Patent No.: US 6,628,872 B2
(45) Date of Patent: Sep. 30, 2003

(54) DISPERSION COMPENSATOR AND OPTICAL TRANSMISSION SYSTEM

(75) Inventors: Mitsuomi Hada, Yokohama (JP); Kohei Kobayashi, Yokohama (JP); Kenji Tamano, Yokohama (JP); Keiichiro Fukuda, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 90 days.

(21) Appl. No.: 09/804,062

(22) Filed: Mar. 13, 2001

(65) Prior Publication Data

US 2001/0051031 A1 Dec. 13, 2001

Related U.S. Application Data

(60) Provisional application No. 60/189,884, filed on Mar. 23, 2000.

(30) Foreign Application Priority Data

Mar. 13, 2000 (JP) .................................. 2000-068966

(51) Int. Cl.⁷ ................................................ G02B 6/02
(52) U.S. Cl. ...................................... 385/123; 385/124
(58) Field of Search .......................... 385/24, 27, 31, 385/32, 122, 123, 124, 127; 359/154

(56) References Cited

U.S. PATENT DOCUMENTS

| | | | |
|---|---|---|---|
| 4,727,237 A | * 2/1988 | Schantz | 219/121.63 |
| 5,042,906 A | 8/1991 | Chesler et al. | |
| 5,191,631 A | * 3/1993 | Rosenberg | 359/173 |
| 5,371,815 A | * 12/1994 | Poole | 359/161 |
| 5,532,868 A | 7/1996 | Gnauck et al. | |
| 5,673,354 A | 9/1997 | Akasaka et al. | |
| 5,822,100 A | 10/1998 | Robinson et al. | |
| 5,880,876 A | 3/1999 | Kikuchi et al. | |
| 5,887,093 A | 3/1999 | Hansen et al. | |
| 5,959,750 A | 9/1999 | Eskildsen et al. | |
| 5,963,700 A | 10/1999 | Kato et al. | |
| 5,995,278 A | 11/1999 | Kikuchi et al. | |
| 5,995,694 A | * 11/1999 | Akasaka et al. | 385/123 |
| 5,995,695 A | 11/1999 | Aikawa et al. | |
| 6,009,221 A | 12/1999 | Tsuda | |
| 6,091,873 A | 7/2000 | Matsuo et al. | |
| 6,157,754 A | 12/2000 | Sasaoka et al. | |
| 6,178,036 B1 | 1/2001 | Yao | |
| 6,178,279 B1 | 1/2001 | Mukasa et al. | |
| 6,339,665 B1 | * 1/2002 | Danziger | 359/161 |
| 6,393,188 B1 | * 5/2002 | Jeong et al. | 385/123 |
| 6,421,490 B1 | * 7/2002 | Liu | 385/127 |

FOREIGN PATENT DOCUMENTS

| | | |
|---|---|---|
| JP | 4-234003 | 8/1992 |
| JP | 8-313750 | 11/1996 |
| JP | 10-303489 | 11/1998 |
| JP | 10-308706 | 11/1998 |
| JP | 10-325913 | 12/1998 |
| JP | 11-174504 | 7/1999 |
| JP | 11-295079 | 10/1999 |
| JP | 2000-72329 | 3/2000 |

OTHER PUBLICATIONS

Patent Abstracts of Japan, Publication No.: 11–006927, Publication Date: Jan. 12, 1999.
Patent Abstracts of Japan, Publication No. 11–006934, Publication Date: Jan. 12, 1999.

* cited by examiner

*Primary Examiner*—Robert H. Kim
*Assistant Examiner*—Michael H. Caley
(74) *Attorney, Agent, or Firm*—McDermott, Will & Emery

(57) ABSTRACT

There is disclosed a dispersion compensator for compensating for a chromatic dispersion and dispersion slope of an optical fiber transmission line, the dispersion compensator comprising a plurality of dispersion-compensating optical fibers connected to each other, the dispersion-compensating optical fibers each having a dispersion slope compensation ratio of at least 60% with respect to the optical fiber transmission line at a predetermined wavelength, one of said plurality of dispersion-compensating optical fibers having a dispersion slope compensation ratio of at least 80%, another of said plurality of dispersion-compensating optical fibers having a dispersion slope compensation ratio within the range of 60% to 100%.

15 Claims, 7 Drawing Sheets

DISPERSION COMPENSATOR AND OPTICAL TRANSMISSION SYSTEM

This application claims benefit of U.S. provisional application Ser. No. 60/189,884, filed Mar. 23, 2000.

BACKGROUND OF THE INVENTION

1. Field of the Invention

The present invention relates to a dispersion compensator for compensating for the chromatic dispersion and dispersion slope of an optical fiber transmission line; and an optical transmission system comprising an optical fiber transmission line and a dispersion compensator.

2. Related Background Art

In optical transmission systems carrying out optical communications by propagating signal light through an optical fiber transmission line, it is desired that the accumulated chromatic dispersion of the optical fiber transmission line have a small absolute value at the signal light wavelength (e.g., 1.55 μm) in order to suppress the waveform deterioration of the signal light when it propagates through the optical fiber transmission line. Also, in wavelength division multiplexing (WDM) transmission systems carrying out optical communications by multiplexing a plurality of wavelengths of signal light, it is desired that the accumulated chromatic dispersion of the optical fiber transmission line should be small in a signal light wavelength band including individual wavelengths of the plurality of wavelengths of signal light. Namely, it is desirable for the optical fiber transmission line to have not only a small absolute value of chromatic dispersion but also a small absolute value of dispersion slope in the signal light wavelength band.

However, typical single-mode optical fibers employed as optical fiber transmission lines in general have a zero-dispersion wave length near a wavelength of 1.3 μm, while having a chromatic dispersion of about 17 ps/nm/km and a dispersion slope of about 0.058 ps/nm²/km at a wavelength of 1.55 μm. As a consequence, it is difficult to carry out high capacity WDM transmission if an optical fiber transmission line is constituted by these single-mode optical fibers alone.

Therefore, it has been proposed to compensate for the chromatic dispersion and dispersion slope of a single-mode optical fiber by using a dispersion-compensating optical fiber whose chromatic dispersion and dispersion slope are both negative at a wavelength of 1.55 μm, so as to lower both the respective absolute values of the average chromatic dispersion and average dispersion slope of the whole system at a wavelength of 1.55 μm.

SUMMARY OF THE INVENTION

For compensating for both the respective absolute values of the average chromatic dispersion and average dispersion slope of the whole system comprising a single-mode optical fiber and a dispersion-compensating optical fiber, it is necessary that both the chromatic dispersion and dispersion slope of the dispersion-compensating optical fiber should be designed appropriately according to the length ratio between the single-mode optical fiber and the dispersion-compensating optical fiber and the chromatic dispersion characteristic of the single-mode optical fiber, and that the dispersion-compensating optical fiber be manufactured as designed.

However, the chromatic dispersion characteristic of the dispersion-compensating optical fiber is quite sensitive to changes in the drawing tension and core diameter in the longitudinal direction at the time when its optical fiber preform is drawn. Also, the processing precision of the optical fiber preform may not be sufficient, and the accuracy in measurement of refractive index distribution in the optical fiber preform carried out by a preform analyzer is may not be sufficient, either. Therefore, it is difficult for a dispersion-compensating optical fiber having the aimed chromatic dispersion characteristic to be manufactured with a high precision.

For example, while the dispersion slope compensation ratio η is ideally desired to be 100%, the dispersion slope compensation ratio η may fluctuate among actually manufactured dispersion-compensating optical fibers approximately within the range of 50% to 120% with its average value being about 90%. Here, the dispersion slope compensation ratio η is an index representing the degree of compensation when a dispersion-compensating optical fiber compensates for the chromatic dispersion and dispersion slope of a single-mode optical fiber. The dispersion slope compensation ratio η (%) is defined by the following expression:

$$\eta = 100 \cdot (D_{SMF}/S_{SMF})/(D_{DCF}/S_{DCF}) \quad (1)$$

where $D_{SMF}$ is the chromatic dispersion of the single-mode optical fiber, $S_{SMF}$ is the dispersion slope of the single-mode optical fiber, $D_{DCF}$ is the chromatic dispersion of the dispersion-compensating optical fiber, and $S_{DCF}$ is the dispersion slope of the dispersion-compensating optical fiber.

Thus, if the dispersion slope compensation ratio η of an actually manufactured dispersion-compensating optical fiber greatly differs from the ideal value of 100%, then this dispersion-compensating optical fiber cannot fully compensate for the chromatic dispersion and dispersion slope of the single-mode optical fiber. In this case, it is hard to carry out WDM transmission over a wide band and optical transmission with a high bit rate (e.g., 40 Gb/s).

Here, the dispersion slope compensation ratio η of each of manufactured dispersion-compensating optical fibers may be measured, so as to selectively use those whose dispersion slope compensation ratio η lies within a predetermined range. However, this, procedure is undesirable in that the yield is not favorable, so that the price of conforming products becomes higher In order to eliminate the above-mentioned problems, it is an object of the present invention to provide a dispersion compensator which can fully compensate for the chromatic dispersion and dispersion slope of an optical fiber transmission line even when the dispersion slope compensation ratio η fluctuates among actually manufactured dispersion-compensating optical fibers, and an optical transmission system in which both the respective absolute values of the average chromatic dispersion and average dispersion slope of the whole system are lowered.

The dispersion compensator in accordance with the present invention is a dispersion compensator for compensating for the chromatic dispersion and dispersion slope of an optical fiber transmission line in which a plurality of dispersion-compensating optical fibers each having a dispersion slope compensation ratio of at least 60% with respect to the optical fiber transmission line at a predetermined wavelength (e.g., 1.55 μm) are connected to each other, one of the plurality of dispersion-compensating optical fibers has a dispersion slope compensation ratio of at least 80% and another of the plurality of dispersion-compensating optical fibers has a dispersion slope compensation ratio within the range of 60% to 100%.

The average dispersion slope compensation ratio of this dispersion compensator is an average value of the respective dispersion slope compensation ratios of the plurality of dispersion-compensating optical fibers in a certain sense, and can become a value near 100% if the ratio of respective lengths of the plurality of dispersion-compensating optical fibers is appropriately set. Hence, if the respective lengths of the plurality of dispersion-compensating optical fibers are appropriately set according to the length of an optical fiber transmission line (a single-mode optical fiber in general), then the dispersion compensator can fully compensate for both the chromatic dispersion and dispersion slope of the optical fiber transmission line. Also, even when the dispersion slope compensation ratio $\eta$ fluctuates among actually manufactured dispersion-compensating optical fibers, the dispersion slope compensation ratio $\eta$ of each dispersion-compensating optical fiber is measured after manufacture, and a plurality of dispersion-compensating optical fibers are connected according to results of the measurement so as to construct the dispersion compensator as mentioned above. As a consequence, the manufactured dispersion-compensating optical fibers can be used efficiently, whereby the dispersion compensator becomes inexpensive.

In the dispersion compensator in accordance with the present invention, the average dispersion slope compensation ratio of the plurality of dispersion-compensating optical fibers may be at least 80%. In this case, the dispersion compensator can fully compensate for both the chromatic dispersion and dispersion slope of the optical fiber transmission line.

In the dispersion compensator in accordance with the present invention, a plurality of dispersion-compensating optical fibers may be connected in the order of increasing effective area thereof. In this case, signal light having a higher power propagates through a dispersion-compensating optical fiber having a relatively larger effective area, so that the generation of nonlinear optical phenomena can be suppressed, whereby transmission characteristics become excellent.

In the dispersion compensator in accordance with the present invention, of the plurality of dispersion-compensating optical fibers, first and second dispersion-compensating optical fibers cascaded to each other may be fusion-spliced to each other. In this case, the splice loss between the first and second dispersion-compensating optical fibers is low. In this case, it is preferred that the fusion-spliced portion between the first and second dispersion-compensating optical fibers be re-coated with a resin material having a coating diameter substantially equal to the coating diameter of each of the first and second dispersion-compensating optical fibers, and be wound about a bobbin together with the first and second dispersion-compensating optical fibers. Also, it is preferred that the fusion-spliced portion between the first and second dispersion-compensating optical fibers be re-coated with a resin material and be secured with reinforcement means. It is also preferred that the plurality of dispersion-compensating optical fibers be contained in a bundle state free of any body portion substantially in contact therewith. In any of these cases, each of the plurality of dispersion-compensating optical fibers can be contained in a compact state while securing a mechanical strength in the fusion-spliced portion and suppressing the increase in transmission loss.

The optical transmission system in accordance with the present invention comprises an optical fiber transmission line for transmitting signal light; and the above-mentioned dispersion compensator, in which a plurality of dispersion-compensating optical fibers are connected to each other, for compensating for the chromatic dispersion and dispersion slope of the optical fiber transmission line. In this optical transmission system, the dispersion compensator compensates for the chromatic dispersion and dispersion slope of the optical fiber transmission line, whereby the respective absolute values of the average chromatic dispersion and average dispersion slope of the optical fiber transmission line and dispersion compensator are lowered. As a consequence, this optical transmission system can carry out WDM transmission over a wide band and optical transmission with a high bit rate.

The optical transmission system in accordance with the present invention may be configured such that a plurality of dispersion-compensating optical fibers are connected in the order of increasing effective area thereof, and that signal light is fed from the side of the dispersion-compensating optical fiber having a larger effective area. In this case, the occurrence of nonlinear optical phenomena can be suppressed in the dispersion compensator, whereby transmission characteristics become excellent.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained in detail with reference to the accompanying drawings. In the explanation of the drawings, constituents identical to each other will be referred to with numerals identical to each other without repeating their overlapping descriptions.

Figure 1:
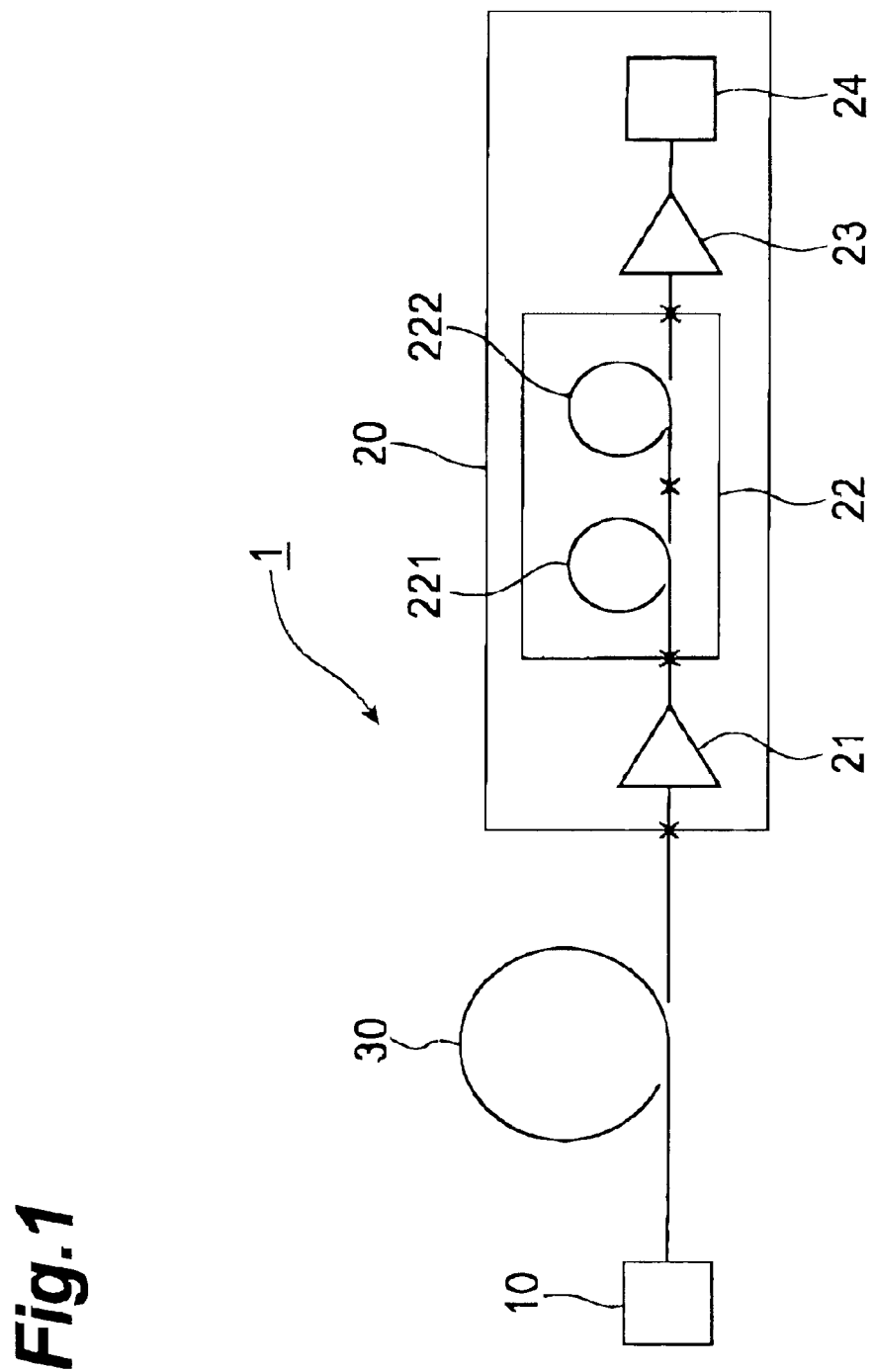
FIG. 1 is a schematic block diagram of the optical transmission system in accordance with an embodiment thereof.

First, respective embodiments of the optical transmission system and dispersion compensator in accordance with the present invention will be explained with reference to FIGS. 1 to 3. FIG. 1 is a schematic block diagram of the optical transmission system 1 in accordance with an embodiment. In this optical transmission system 1, an optical fiber transmission line 30 is laid between a transmitter station (or repeater station) 10 and a receiver station (or repeater station) 20. Provided within the receiver station 20 are an optical amplifier 21, a dispersion compensator 22, an optical amplifier 23, and a receiver 24. In the optical transmission system 1, signal light sent out from the transmitter station 10 propagates through the optical fiber transmission line 30 and reaches the receiver station 20. The signal light having reached the receiver station 20 is optically amplified by the optical amplifier 21, the dispersion of the amplified light is compensated for by the dispersion compensator 22, thus obtained light is optically amplified by the optical amplifier 23, and then the amplified light is received by the receiver 24.

As the optical fiber transmission line 30, a typical single-mode optical fiber having a zero-dispersion wavelength near a wavelength of 1.3 μm is used, for example. In this case, at a signal light wavelength of 1.55 μm, the optical fiber transmission line 30 has a chromatic dispersion of about 17 ps/nm/km and a dispersion slope of about 0.058 ps/nm²/km.

Each of the optical amplifiers 21 and 23 optically amplifies the signal light fed therein and outputs the amplified signal light. Preferably employed as each of the optical amplifiers 21 and 23 is an optical fiber amplifier (EDFA: Erbium Doped Fiber Amplifier) using, as its optical amplification medium, an Er element doped optical fiber whose optical waveguide region is doped with Er element.

The dispersion compensator 22 compensates for the chromatic dispersion and dispersion slope of the optical fiber transmission line 30. Namely, at a signal light wavelength of 1.55 μm, the dispersion compensator 22 has a chromatic dispersion with an opposite sign of the chromatic dispersion of the optical fiber transmission line 30, and a dispersion slope with an opposite sign of the dispersion slope of the optical fiber transmission line 30. In the case where the optical fiber transmission line 30 is a single-mode optical fiber, both the chromatic dispersion and dispersion slope of the dispersion compensator 22 are negative at a signal light wavelength of 1.55 μm. The dispersion compensator 22 is constituted by a plurality of dispersion-compensating optical fibers connected to each other.

Here, it is assumed that the dispersion compensator 22 is constituted by two kinds of dispersion-compensating optical fibers 221 and 222 which are connected to each other. Each of the dispersion-compensating optical fibers 221 and 222 has a dispersion slope compensation ratio of at least 60%. One of the dispersion-compensating optical fibers 221 and 222 has a dispersion slope compensation ratio of at least 80%, whereas the other has a dispersion slope compensation ratio within the range of 60% to 100%. Since bending loss increases in a dispersion-compensating optical fiber as its dispersion slope compensation ratio is made greater in general, the upper limit of the dispersion slope compensation ratio in each of the dispersion-compensating optical fibers 221 and 222 is about 150% in practice.

Figure 2:
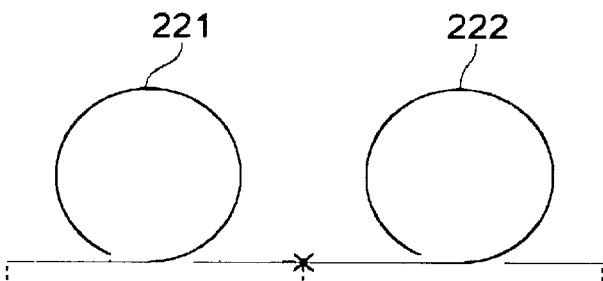
FIG. 2 is an explanatory view of the dispersion compensator in accordance with an embodiment thereof.

FIG. 2 is an explanatory view of the dispersion compensator 22 in accordance with this embodiment. As shown in this drawing, let $L_1$, $D_1$, $S_1$, $\eta_1$, and $A_1$ be the length, chromatic dispersion, dispersion slope, dispersion slope compensation ratio, and effective area of the dispersion-compensating optical fiber 221 on the upstream side, respectively. Let $L_2$, $D_2$, $S_2$, $\eta_2$, and $A_2$ be the length, chromatic dispersion, dispersion slope, dispersion slope compensation ratio, and effective area of the dispersion-compensating optical fiber 222 on the downstream side, respectively.

Letting $D_{SMF}$ and $S_{SMF}$ be the chromatic dispersion and dispersion slope of the optical fiber transmission line (single-mode optical fiber) 30, their ratio R is represented by the following expression;

$$R = D_{SMF}/S_{SMF} \quad (2)$$

Here, the dispersion slope compensation ratio $\eta_1$ of the dispersion-compensating optical fiber 221 and the dispersion slope compensation ratio $\eta_2$ of the dispersion-compensating optical fiber 222 are represented by the following respective expressions:

$$\eta_1 = 100 \cdot R \cdot S_1/D_1 \quad (3a)$$

$$\eta_2 = 100 \cdot R \cdot S_2/D_2 \quad (3b)$$

The average chromatic dispersion $D_{ave}$ and average dispersion slope $S_{ave}$ of the dispersion compensator 22 constituted by the dispersion-compensating optical fibers 221 and 222 connected to each other are represented by the following respective expressions;

$$D_{ave} = (D_1 \cdot L_1 + D_2 \cdot L_2)/(L_1 + L_2) \quad (4a)$$

$$S_{ave} = (S_1 \cdot L_1 + S_2 \cdot L_2)/(L_1 + L_2) \quad (4b)$$

whereas the average dispersion slope compensation ratio $\eta_{ave}$ of the dispersion compensator 22 is represented by the following expression:

$$\eta_{ave} = 100 \cdot R \cdot S_{ave}/D_{ave}$$
$$= 100 \cdot R \cdot (S_1 \cdot L_1 + S_2 \cdot L_2)/(D_1 \cdot L_1 + D_2 \cdot L_2) \quad (5)$$

If the length $L_1$ of the dispersion-compensating optical fiber 221 and the length $L_2$ of the dispersion-compensating optical fiber 222 are equal to each other, then the average dispersion slope compensation ratio, $\eta_{ave}$ of the dispersion compensator 22 is represented by the following expression:

$$\eta_{ave} = 100 \cdot R \cdot (S_1 + S_2)/(D_1 + D_2) \quad (6)$$

If the length $L_1$ of the dispersion-compensating optical fiber 221 and the length $L_2$ of the dispersion-compensating optical fiber 222 are equal to each other, and the chromatic dispersion $D_1$ of the dispersion-compensating optical fiber 221 and the chromatic dispersion $D_2$ of the dispersion-compensating optical fiber 222 are equal to each other, then the average dispersion slope compensation ratio $\eta_{ave}$ of the dispersion compensator 22 is represented by the following expression:

$$\eta_{ave} = (\eta_1 + \eta_2)/2 \quad (7)$$

Figure 3:
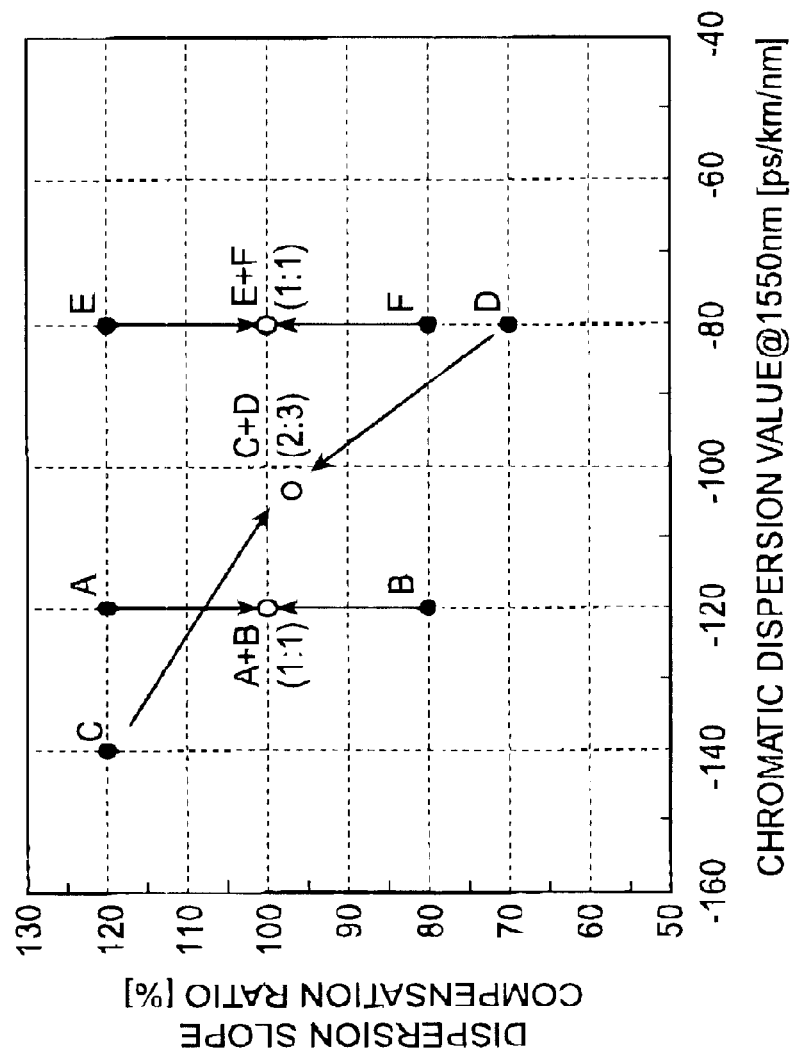
FIG. 3 is an explanatory chart of specific examples of the dispersion compensator in accordance with the embodiment.

FIG. 3 is an explanatory chart of specific examples of the dispersion compensator 22 in accordance with this embodiment. This chart shows three cases of the dispersion compensator 22 at a wavelength of 1.55 μm.

Case 1 indicates an example having dispersion-compensating optical fibers A, B as the dispersion-compensating optical fibers 221, 222. The dispersion-compensating optical fiber A has a chromatic dispersion of −120 ps/nm/km and a dispersion slope compensation ratio of 120%. The dispersion-compensating optical fiber B has a chromatic dispersion of −120 ps/nm/km and a dispersion slope compensation ratio of 80%. The length ratio of the dispersion-compensating optical fibers A and B is 1:1. In this case, the dispersion compensator 22 in which the dispersion-compensating optical fibers A and B are connected to each other has an average chromatic dispersion of −120 ps/nm/km and an average dispersion slope compensation ratio $\eta_{ave}$ of 100%.

Case 2 indicates an example having dispersion-compensating optical fibers C, D as the dispersion-compensating optical fibers 221, 222. The dispersion-compensating optical fiber C has a chromatic dispersion of −140 ps/nm/km and a dispersion slope compensation ratio of 120%. The dispersion-compensating optical fiber D has a chromatic dispersion of −80 ps/nm/km and a dispersion slope compensation ratio of 70%. The length ratio of the dispersion-compensating optical fibers C and D is 2:3. In this case, the dispersion compensator 22 in which the dispersion-compensating optical fibers C and D are connected to each other has an average chromatic dispersion of −104 ps/nm/km and an average dispersion slope compensation ratio $\eta_{ave}$ of 98%.

Case 3 indicates an example having dispersion-compensating optical fibers E, F as the dispersion-compensating optical fibers 221, 222. The dispersion-compensating optical fiber E has a chromatic dispersion of −80 ps/nm/km and a dispersion slope compensation ratio of 120%. The dispersion-compensating optical fiber F has a chromatic dispersion of −80 ps/nm/km and a dispersion slope compensation ratio of 80%. The length ratio of the dispersion-compensating optical fibers E and F is 1:1. In this case, the dispersion compensator 22 in which the dispersion-compensating optical fibers E and F are connected to each other has an average chromatic dispersion of −80 ps/nm/km and an average dispersion slope compensation ratio $\eta_{ave}$ of 100%.

As can be seen from the foregoing, the average dispersion slope compensation ratio $\eta_{ave}$ of the dispersion compensator 22 is an average value of the dispersion slope compensation ratio $\eta_1$ of the dispersion-compensating optical fiber 221 and the dispersion slope compensation ratio $\eta_2$ of the dispersion-compensating optical fiber 222 in a certain sense. Also, as mentioned above, a while each of the dispersion-compensating optical fibers 221 and 222 has a dispersion slope compensation ratio of at least 60%, one of them has a dispersion slope compensation ratio of at least 80%, whereas the other has a dispersion slope compensation ratio within the range of 60% to 100%. Thus, the dispersion compensator 22 can attain an average dispersion slope compensation ratio $\eta_{ave}$ near 100% by appropriately setting the length ratio of the dispersion-compensating optical fibers 221 and 222. Preferably, the average dispersion slope compensation ratio $\eta_{ave}$ of the dispersion compensator is at least 80% but not greater than 120%.

As a consequence, the dispersion compensator 22 can fully compensate for both the chromatic dispersion and dispersion slope of the optical fiber transmission line 30 if the respective lengths of the dispersion-compensating optical fibers 221 and 222 are appropriately set according to the length of the optical fiber transmission line (single-mode optical fiber) 30. Hence, the optical transmission system 1 using this dispersion compensator 22 becomes one in which both of the respective absolute values of average chromatic dispersion and average dispersion slope in the whole system including the optical fiber transmission line 30 and the dispersion compensator 22 are lowered. As a consequence, the optical transmission system 1 can carry out WDM transmission over a wide band and optical transmission with a high bit rate (e.g., 40 Gb/s).

Also, even if the dispersion slope compensation ratio $\eta$ fluctuates among actually manufactured dispersion-compensating optical fibers, the dispersion slope compensation ratio $\eta$ of each dispersion-compensating optical fiber is measured after manufacture, and a plurality of dispersion-compensating optical fibers are connected according to results of the measurement so as to construct the dispersion compensator 22 as mentioned above. Hence, the manufactured dispersion-compensating optical fibers can be used efficiently, whereby the dispersion compensator 22 becomes inexpensive. Since each of the dispersion-compensating optical fibers 221 and 222 has a dispersion slope compensation ratio of at least 60%, and one of them has a dispersion slope compensation ratio of at least 80%, whereas the other has a dispersion slope compensation ratio within the range of 60% to 100%, this embodiment is preferred in cases where the dispersion slope compensation ratio $\eta$ fluctuates among actually manufactured dispersion-compensating optical fibers approximately within the range of 50% to 120% with its average value being about 90%.

Further, it is preferable in terms of suppressing the generation of nonlinear optical phenomena if the effective area $A_1$ of the dispersion-compensating optical fiber 221 on the upstream side is greater than the effective area $A_2$ of the dispersion-compensating optical fiber 222 on the downstream side. Namely, while the signal light fed into the dispersion-compensating optical fiber 221 on the upstream side has a higher power in the case where the optical amplifier 21 exists in front of the dispersion compensator 22 as shown in FIG. 1, the generation of nonlinear optical phenomena in the dispersion-compensating optical fiber 221 will be suppressed if the effective area $A_1$ of the dispersion-compensating optical fiber 221 is made relatively larger. On the other hand, even when the effective area $A_2$ of the dispersion-compensating optical fiber 222 is relatively small, the signal light fed into the dispersion-compensation optical fiber 222 after having propagated through the dispersion-compensation optical fiber 221 has a lower power, whereby the occurrence of nonlinear optical phenomena is suppressed in the dispersion-compensation optical fiber 222 as well. Therefore, transmission characteristics become excellent.

Figure 4:
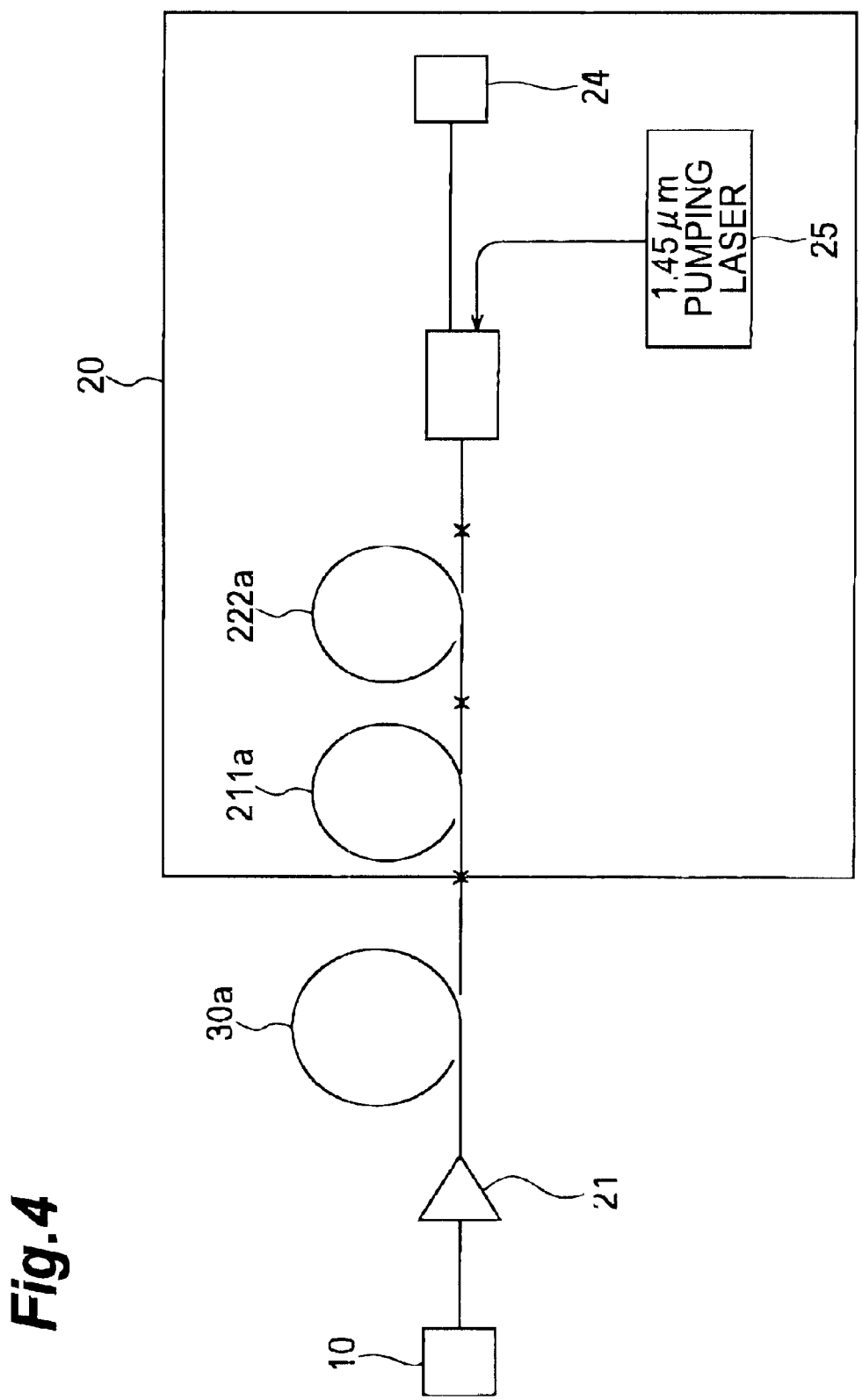
FIG. 4 is a schematic block diagram of another embodiment of the invention.

FIG. 4 shows an embodiment of the combination of Raman amplification and the dispersion compensation in an optical transmission system. In this optical transmission system, an optical fiber transmission line 30a is laid between a transmitter station (or repeater station) 10 and a receiver station (or repeater station) 20, and light signal sent from the transmitter station 10 is amplified in an optical amplifier 21 (EDFA) to transmitted to the dispersion compensator. At an output of the optical transmission line 30a, a dispersion-compensation fibers 211a and 222a are connected in serial. An optical coupler is provided in an output of the dispersion-compensation fiber 222a, and the optical coupler is connected to a pumping light laser for generating an excitation light having a wavelength of 1.45 μm by which the Raman amplification is caused in the dispersion-compensation optical fibers 211a and 222a. An effective area of the dispersion-compensation optical fiber 211a is larger than that of the dispersion-compensation optical fiber 222a. In such arrangement, a optical transmission system in which dispersion of the optical transmission is compensated and the loss of the dispersion-compensation fiber is effectively compensated can be realized.

The nonlinear optical phenomenon degrading the transmission quality of the optical transmission line is be more suppressed when the effective area Aeff of the optical fiber is larger, and the efficiency of the Raman amplification can be more improved when the effective area Aeff of the optical fiber is smaller. So, in view of this fact, in the embodiment shown in FIG. 4, the signal light is guided to the output of the dispersion-compensation optical fiber 211a having a larger effective area Aeff, and the excitation light having the wavelength of 1.45 μm for Raman amplification is guided to an output of the dispersion-compensation optical fiber 222a having a smaller effective area Aeff.

A mode of containing the dispersion-compensation optical fibers 221 and 222 in the dispersion compensator 22 in accordance with this embodiment will now be explained with reference to FIGS. 5 to 9. Though the dispersion-compensation optical fibers 221 and 222 may be connected to each other by an optical connector, they are preferably connected by fusion splice, which yields a lower splice loss. In the case of fusion splice, respective end portions of the dispersion-compensation optical fibers 221 and 222 are stripped of their coatings, and these respective end faces of the glass fibers are butted against each other and heated, so as to be fusion-spliced. However, the mechanical strength of the fusion-spliced portion is weak in this state. Therefore, it is preferred that the dispersion-compensating optical fibers 221 and 222 be contained in the dispersion compensator 22 after their fusion-spliced portion is processed as follows.

Figure 5:
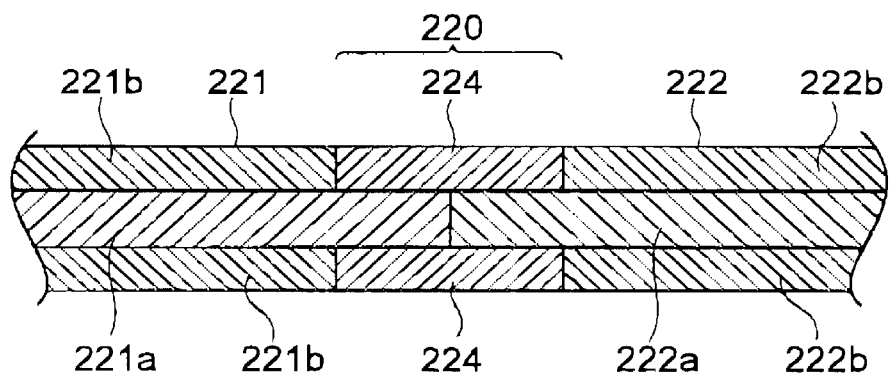
FIG. 5 is an exemplary view of a first example of the mode of containing the dispersion compensator in accordance with the embodiment of FIG. 4.
Figure 6:
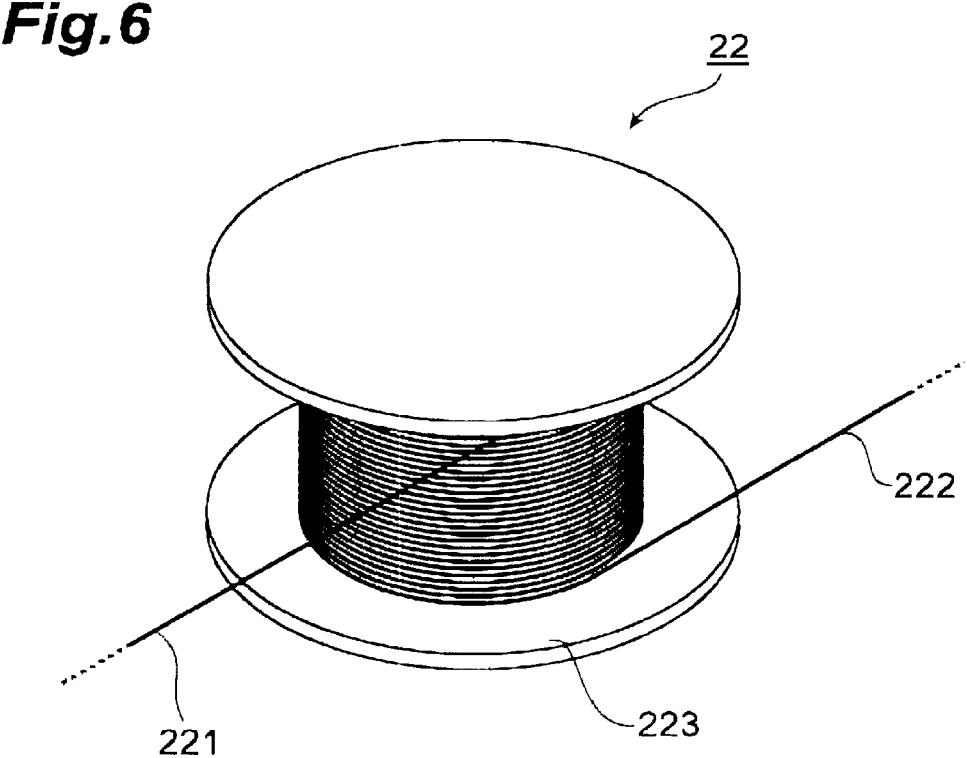
FIG. 6 is an explanatory view of the first example of the mode of containing the dispersion compensator in accordance with the embodiment.

FIGS. 5 and 6 are explanatory views of a first example of the mode of containing the dispersion compensator 22 in accordance with this embodiment. FIG. 5 is a sectional view thereof near a fusion-spliced portion 220, whereas FIG. 5 is a perspective view of the dispersion-compensating optical fibers 221 and 222 wound about a bobbin 223. As shown in FIG. 5, a glass fiber 221a is stripped of its surrounding coating 221b at an end portion of the dispersion-compensating optical fiber 221. Also, a glass fiber 222a is stripped of its surrounding coating 222b at an end portion of the dispersion-compensating optical fiber 222. These end faces of the glass fibers 221a and 222a are fusion-spliced to each other. The surroundings of thus formed fusion-spliced portion (the part stripped of the coating) 220 between the dispersion-compensating optical fibers 221 and 222 are re-coated with a resin material 224 having a coating diameter substantially equal to the coating diameter of each dispersion-compensating optical fiber.

Further, as shown in FIG. 5, the fusion-spliced portion 220 is wound about the bobbin 223 together with the dispersion-compensating optical fibers 221 and 222. As a consequence, the dispersion-compensating optical fibers 221 and 222 can be contained in a compact state while the resin material 224 imparts a mechanical strength to the fusion-spliced portion 220. Also, since the outside diameter of each of the dispersion-compensating optical fibers 221 and 222 is substantially equal to the outside diameter of the resin material 224, no stress applies to the dispersion-compensating optical fibers 221 and 222 due to uneven outside diameters, whereby the increase in loss can be suppressed.

Figure 7:
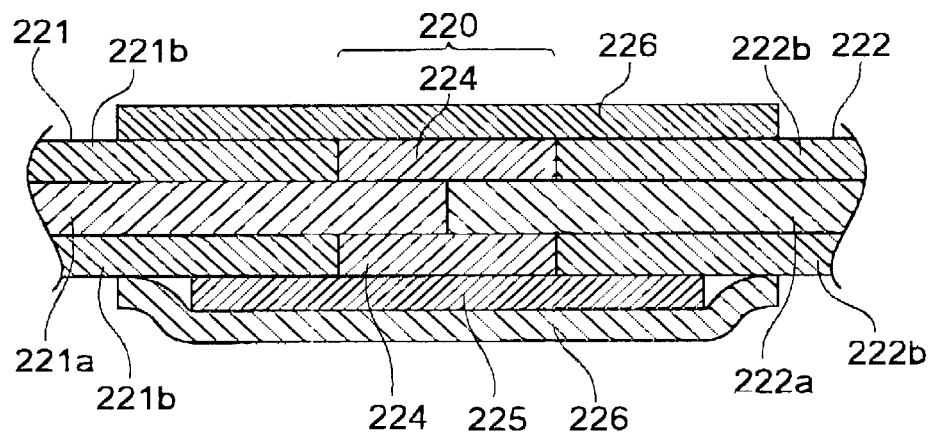
FIG. 7 is an explanatory view of a second example of the mode of containing the dispersion compensator in accordance with the embodiment.
Figure 8:
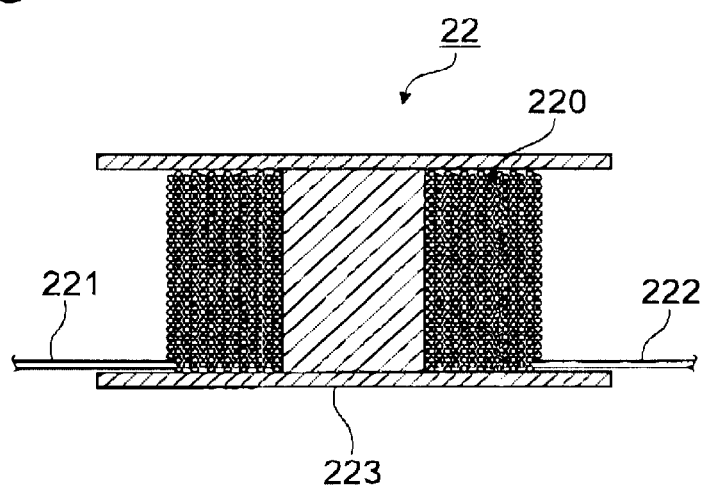
FIG. 8 is an explanatory view of the second example of the mode of containing the dispersion compensator in accordance with the embodiment.

FIGS. 7 and 8 are explanatory views of a second example of the mode of containing the dispersion compensator 22 in accordance with this embodiment. FIG. 7 is a sectional view thereof near the fusion-spliced portion 220, whereas FIG. 7 is a sectional view of the dispersion-compensating optical fibers 221 and 222 wound about the bobbin 223. As can be seen from FIG. 7, the glass fiber 221a is stripped of its surrounding coating 221b at an end portion of the dispersion-compensating optical fiber 221. Also, the glass fiber 222a is stripped of its surrounding coating 222b at an end portion of the dispersion-compensating optical fiber 222. These end faces of the glass fibers 221a and 222a are fusion-spliced to each other. The surroundings of thus formed fusion-spliced portion (the part stripped of the coating) 220 between the dispersion-compensating optical fibers 221 and 222 are re-coated with a resin material 224. The fusion-spliced portion 220 is further provided with a metal bar 225 acting as reinforcement means, and is contained in a shrink tube 226 together with the metal bar 225.

Further, as shown in FIG. 7, the fusion-spliced portion 220 is wound about the bobbin 223 together with the dispersion-compensating optical fibers 221 and 222. The fusion-spliced portion 220 provided with the metal bar 225 is secured to a certain part of the bobbin 223 (e.g., the inner or outer face of a flange thereof). As a consequence, the dispersion-compensating optical fibers 221 and 222 can be contained in a compact state while the metal bar 225 imparts a mechanical strength to the fusion-spliced portion 220. In particular, the reliability of the fusion-spliced portion 220 is high since it is provided with the metal bar 225 acting as reinforcement means.

Figure 9:
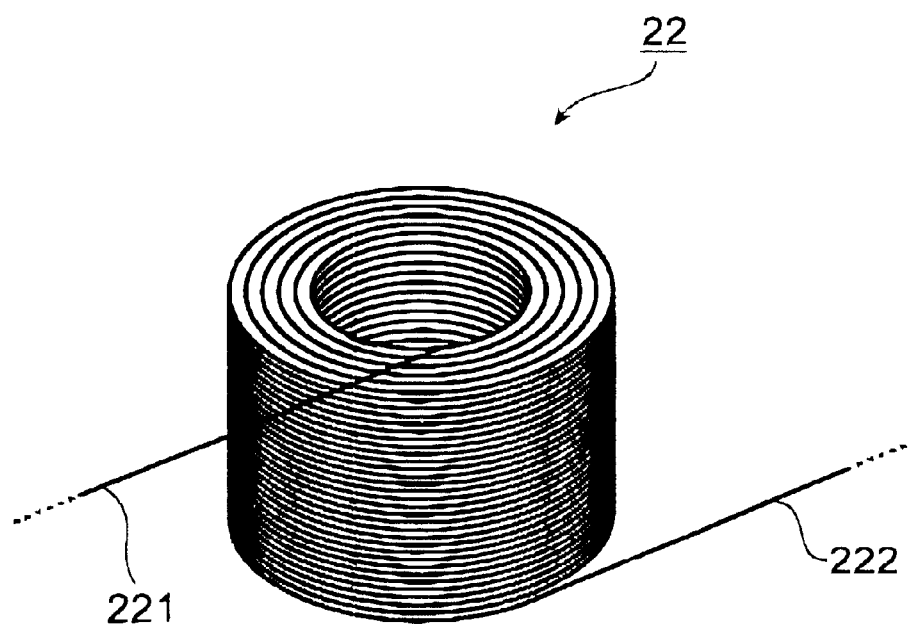
FIG. 9 is an explanatory view of a third example of the mode of containing the dispersion compensator in accordance with the embodiment.

FIG. 9 is an explanatory view of a third example of the mode of containing the dispersion compensator 22 in accordance with this embodiment. Though its structure near the fusion-spliced portion 220 is similar to that shown in FIG. 5, the dispersion-compensating optical fibers 221 and 222 are contained in a bundle state as shown in FIG. 8 without being wound about a bobbin. As a consequence, the dispersion-compensating optical fibers 221 and 222 can be contained in a compact state while a mechanical strength is imparted to the fusion-spliced portion 220. Also, since the outside diameter of each of the dispersion-compensating optical fibers 221 and 222 is substantially equal to the outside diameter of the resin material 224, no stress applies to the dispersion-compensating optical fibers 221 and 222 due to uneven outside diameters, whereby the increase in loss can be suppressed.

Further, since the dispersion-compensating optical fibers 221 and 222 are not wound about a bobbin but contained in a bundle state free of any body portion substantially in contact therewith, no stress applies thereto from the barrel portion of the bobbin, whereby the increase in loss can be suppressed in each dispersion-compensating optical fiber having a sensitive microbend loss characteristic. For securing environmental resistance characteristics of the dispersion-compensating optical fibers 221 and 222, it is also preferable if the dispersion-compensating optical fibers 221 and 222 in a bundle state are filled with a resin material.

When the dispersion-compensating optical fibers 221 and 222 are wound like a coil as shown in each of FIGS. 6, 8, and 9, it is preferred that, of the dispersion-compensating optical fibers 221 and 222, one with the higher dispersion slope compensation ratio η have the larger winding diameter. In general, dispersion-compensating optical fibers yield a greater bending loss as their dispersion slope compensation ratio η is higher. Therefore, when the bending diameter of dispersion-compensating optical fibers is thus made larger as the dispersion slope compensation ratio η is higher, the increase in loss caused by winding the dispersion-compensating optical fibers 221 and 222 like a coil can be suppressed.

Preferably, the respective surfaces of the glass fibers 221a and 222a of the dispersion-compensating optical fibers 221 and 222 are provided with hermetic coatings made of a carbon material or the like. As a consequence, the dispersion-compensating optical fibers 221, 222 improve their fatigue resistance characteristics with respect to the state where they are contained as being wound like a coil at a small bending diameter. Also, the hydrogen gas generated from the surrounding coating material can be prevented from entering the glass fibers 221a, 221b, whereby transmission loss can be kept from increasing.

Without being restricted to the above-mentioned embodiments, the present invention can be modified in various manners. While the dispersion compensator is constituted by two dispersion-compensating optical fibers connected to each other in the above-mentioned embodiments, three or more dispersion-compensating optical fibers may be connected so as to construct the dispersion compensator. In general, when N (N≧2) dispersion-compensating optical fibers are connected so as to construct a dispersion compensator, each of the N dispersion-compensating optical fibers has a dispersion slope compensation ratio of at least 60%, one of the N dispersion-compensation optical fibers has a dispersion slope compensation ratio of at least 80%, and another of the dispersion-compensation optical fibers has a dispersion slope compensation ratio within the range of 60% to 100%. Preferably, the N dispersion-compensation optical fibers in total have an average dispersion slope compensation ratio of at least 80% but not greater than 120%. It is also preferred that the N dispersion-compensation optical fibers be connected in the order of increasing effective area thereof.

Although in the above embodiments, an optical transmission line is explained as a single node fiber (SMF) having a zero chromatic dispersion at the wavelength in 1.3 $\mu$m band, the dispersion compensator and optical transmission system of the present invention can be applied to all of optical fibers having an abnormal dispersion at the wavelength in 1.55 $\mu$m band also. When such optical fibers having an abnormal dispersion at tie wavelength in 1.55 $\mu$m band is applied to the dispersion compensator and the optical line transmission system, in the above explanation, "$D_{SMF}$" and "$S_{SMF}$" in the above equations should be read as the corresponding characteristics (of such optical fiber.

Concretely, the above optical fiber of 1.55 $\mu$m band may be referred as a none-zero dispersion shifted fiber (NZ-DSF) of which the dispersion at the wavelength in 1.55 $\mu$m band is +2 ps/km/nm to +10 ps/km/nm, the dispersion slope is from +0.03 ps/km/nm$^2$ to +0.1 ps/km/nm$^2$.

Further, although in the above explanation, the wavelength of signal light used therein is referred as the wavelength of 1.55 $\mu$m band, the dispersion compensator and the optical transmission system according to the present invention can be applied to the signal light having the wavelength of 1600 nm band (L-band) or the wavelength of 1.45 $\mu$m band (S-band) also. In this case, the above stated advantages obtained in the present invention can be obtained in the transmission optical line having an abnormal dispersion at the wavelength at the each of the above stated wavelength bands also.

As explained in detail in the foregoing, the dispersion compensator in accordance with the present invention is a dispersion compensator for compensation for the chromatic dispersion and dispersion slope of an optical fiber transmission line, in which a plurality of dispersion-compensation optical fibers each having a dispersion slope compensation ratio of at least 60% are connected to each other, one of the plurality of dispersion-compensation optical firers has a dispersion slope compensation ratio of at least 80%, and another of the plurality of dispersion-compensation optical fibers has a dispersion slope compensation ratio within the range of 60% to 100%. When the ratio of respective lengths of the plurality of dispersion-compensating optical fibers is appropriately set, the average dispersion slope compensation ratio of the dispersion compensator can attain a value near 100%. As a consequence, the dispersion compensator can fully compensate for both the chromatic dispersion and dispersion slope of the optical fiber transmission line if the respective lengths of the plurality of dispersion-compensating optical fibers are appropriately set according to the length of the optical fiber transmission line. Also, even when the dispersion slope compensation ratio η fluctuates among actually manufactured dispersion-compensating optical fibers, the dispersion slope compensation ratio η of each dispersion-compensating optical fiber is measured after manufacture, and a plurality of dispersion-compensating optical fibers are connected according to results of the measurement so as to construct the dispersion compensator as mentioned above. As a consequence, the manufactured dispersion-compensating optical fibers can be used efficiently, whereby the dispersion compensator becomes inexpensive.

In the case where the average dispersion slope compensation ratio of the plurality of dispersion-compensating optical fibers in total is at least 80%, then the dispersion compensator can fully compensate for both the chromatic dispersion and dispersion slope of the optical fiber transmission line. In the case where the plurality of dispersion-compensating optical fibers are connected in the order of increasing effective area thereof, signal light having a higher power propagates through a dispersion-compensating optical fiber having a relatively larger effective area, so that the occurrence of nonlinear optical phenomena can be suppressed, whereby transmission characteristics become excellent.

In the case where, of the plurality of dispersion-compensating optical fibers, first and second dispersion-compensating optical fibers cascaded to each other are fusion-spliced to each other, the splice loss between the first and second dispersion-compensating optical fibers is low. In this case, it is preferred that the fusion-spliced portion between the first and second dispersion-compensating optical fibers be re-coated with a resin material having a coating diameter substantially equal to the coating diameter of each of the first and second dispersion-compensating optical fibers, and be wound about a bobbin together with the first and second dispersion-compensating optical fibers. Also, it is preferred that the fusion-spliced portion between the first and second dispersion-compensating optical fibers be re-coated with a resin material and be secured with reinforcement means. It is also preferred that the plurality of dispersion-compensating optical fibers be contained in a bundle state free of any body portion substantially in contact therewith. In any of these cases, each of the plurality of dispersion-compensating optical fibers can be contained in a compact state while securing a mechanical strength in the fusion-spliced portion and suppressing the increase in transmission loss.

In the optical transmission system in accordance with the present invention, the dispersion compensator compensates for the chromatic dispersion and dispersion slope of the optical fiber transmission line, whereby both the respective absolute values of the average chromatic dispersion and average dispersion slope of the optical fiber transmission line and dispersion compensator are reduced. As a consequence, this optical transmission system can carry out WDM transmission over a wide band and optical transmission with a high bit rate. Also, in the case where the plurality of dispersion-compensating optical fibers in the dispersion compensator are connected in the order of increasing effective area thereof, while signal light is fed from the side of the dispersion-compensating optical fiber having the larger effective area, the occurrence of nonlinear optical phenomena can be suppressed in the dispersion compensator, whereby transmission characteristics become excellent;

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A dispersion compensator for compensating for a chromatic dispersion and dispersion slope of an optical fiber transmission line;

said dispersion compensator comprising a plurality of dispersion-compensating optical fibers connected to each other, said dispersion-compensating optical fibers each having a dispersion slope compensation ratio of at least 60% with respect to said optical fiber transmission line at a predetermined wavelength;

one of said plurality of dispersion-compensating optical fibers having a dispersion slope compensation ratio of at least 80%;

another of said plurality of dispersion-compensating optical fibers having a dispersion slope compensation ratio within the range of 60% to 100%.

2. A dispersion compensator according to claim 1, wherein said plurality of dispersion-compensating optical fibers in total have an average dispersion slope compensation ratio of at least 80%.

3. A dispersion compensator according to claim 1, wherein said plurality of dispersion-compensating optical fibers are connected in the order of increasing effective area thereof.

4. A dispersion compensator according to claim 3, wherein said plurality of dispersion-compensating optical fibers are connected in the order of increasing dispersion slope compensation ratio thereof.

5. An optical transmission system according to claim 4, wherein said plurality of dispersion-compensating optical fibers are connected in the order of increasing effective area thereof, and signal light is fed from the side of the dispersion-compensating optical fiber having a larger effective area.

6. A compensator according to claim 3, wherein said plurality of dispersion-compensating optical fibers are connected in order of increasing dispersion slope compensation ratio thereof, and a signal light is input to an input end of said plurality of dispersion-compensating fibers, having a larger effective area and smaller dispersion slope compensation ratio.

7. A dispersion compensator according to claim 1, wherein, of said plurality of dispersion-compensating optical fibers, first and second dispersion-compensating optical fibers cascaded to each other are fusion-spliced.

8. A dispersion compensator according to claim 7, wherein the fusion-spliced portion between said first and second dispersion-compensating optical fibers is re-coated with a resin material having a coating diameter substantially equal to the coating diameter of each of said first and second dispersion-compensating optical fibers, and is wound on a bobbin together with said first and second dispersion-compensating optical fibers.

9. A dispersion compensator according to claim 7, wherein the fusion-spliced portion between said first and second dispersion-compensating optical fibers is re-coated with a resin material and is secured with a reinforcement.

10. A dispersion compensator according to claim 7, wherein said plurality of dispersion-compensating optical fibers are contained in a bundle state free of any body portion substantially in contact therewith.

11. An optical transmission system comprising:

an optical fiber transmission line for transmitting signal light; and the dispersion compensator of claim 1.

12. An optical transmission system according to claim 11, wherein said plurality of dispersion-compensating optical fibers are connected in order of increasing dispersion slope compensation ratio thereof, and a signal light is input to an input end of said plurality of dispersion-compensating optical fibers, having a larger effective area, and an exciting light for causing Raman amplification is input to an input end of said plurality of dispersion-compensating optical fibers, having a smaller effective area.

13. A dispersion compensator for compensating for a chromatic dispersion and dispersion slope of an optical fiber transmission line;

said dispersion compensator comprising a plurality of dispersion-compensating optical fibers connected to each other, said dispersion-compensating optical fibers each having a dispersion slope compensation ratio from 70% to 120% with respect to said optical fiber transmission line at a predetermined wavelength.

14. A dispersion compensator for compensating for a chromatic dispersion and dispersion slope of an optical fiber transmission line;

said dispersion compensator comprising a plurality of dispersion-compensating optical fibers connected to each other, said dispersion-compensating optical fibers each having a dispersion slope compensation ratio from 70% to 120% with respect to said optical fiber transmission line at a predetermined wavelength;

said plurality of dispersion-compensating optical fibers in total have an average dispersion slope compensation ratio of at least 80%.

15. A dispersion compensator for compensating for a chromatic dispersion and dispersion slope of an optical fiber transmission line;

said dispersion compensator comprising a plurality of dispersion-compensating optical fibers connected to each other, said dispersion-compensating optical fibers each having a dispersion slope compensation ratio from 70% to 120% with respect to said optical fiber transmission line at a predetermined wavelength; said plurality of dispersion-compensating optical fibers in total have an average disperation slope compensation ratio of 100±5%.

* * * * *